(12) United States Patent
Yagi et al.

(10) Patent No.: US 6,780,915 B2
(45) Date of Patent: Aug. 24, 2004

(54) RUBBER COMPOSITION FOR THE SIDEWALL OF A TIRE AND A PNEUMATIC USING THE SAME

(75) Inventors: Noriko Yagi, Kobe (JP); Kiyoshige Muraoka, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 10/263,644

(22) Filed: Oct. 4, 2002

(65) Prior Publication Data

US 2003/0105205 A1 Jun. 5, 2003

(30) Foreign Application Priority Data

Oct. 4, 2001 (JP) ........................................ 2001-308589

(51) Int. Cl.⁷ ................................................ C08K 3/26
(52) U.S. Cl. ........................ 524/425; 524/80; 524/493; 524/496; 525/332.7
(58) Field of Search .......................... 524/425, 80, 493, 524/496; 525/332.7

(56) References Cited

U.S. PATENT DOCUMENTS

| | | | | |
|---|---|---|---|---|
| 5,216,066 A | * | 6/1993 | Sandstrom et al. | 524/495 |
| 5,896,904 A | * | 4/1999 | Ozaki et al. | 523/200 |
| 6,013,737 A | * | 1/2000 | Takagishi et al. | 525/332.7 |
| 6,147,178 A | * | 11/2000 | Nakamura et al. | 526/340 |
| 6,506,849 B1 | * | 1/2003 | Hojo et al. | 525/332.7 |

FOREIGN PATENT DOCUMENTS

| | | | |
|---|---|---|---|
| EP | 0933391 A1 | * | 8/1999 |
| EP | 0 933 391 A1 | | 8/1999 |
| EP | 1260544 A1 | * | 11/2002 |
| EP | 1 260 544 A1 | | 11/2002 |
| EP | 1300437 A1 | * | 4/2003 |
| JP | 9-150606 A | | 6/1997 |
| JP | 9-272306 A | | 10/1997 |
| JP | 10-87896 A | | 4/1998 |
| JP | 10087896 | * | 4/1998 |
| JP | 10-158435 A | | 6/1998 |
| JP | 11-124471 A | | 5/1999 |

OTHER PUBLICATIONS

English language abstract for Japanese Patent Publication No. JP 63069849A (a Patent Family of JP 93–008937B).

* cited by examiner

*Primary Examiner*—David W. Wu
*Assistant Examiner*—Henry S. Hu
(74) *Attorney, Agent, or Firm*—Birch, Stewart, Kolasch & Birch, LLP

(57) ABSTRACT

A rubber composition for a tire sidewall which can prevent color change to brown and has sufficient ozone resistance and improved low heat build-up characteristics, and a pneumatic tire having a sidewall containing such a rubber composition. The rubber composition includes 5 to 150 parts by weight of carbon black having a nitrogen adsorption specific surface area of 70 to 300 $m^2/g$ and 5 to 100 parts by weight of calcium carbonate based on 100 parts by weight of a rubber component containing 20 to 70% by weight of a natural rubber and 30 to 80% by weight of a synthetic diene rubber.

3 Claims, No Drawings

RUBBER COMPOSITION FOR THE SIDEWALL OF A TIRE AND A PNEUMATIC USING THE SAME

BACKGROUND OF THE INVENTION

The present invention relates to a rubber composition for a tire sidewall and to a pneumatic tire using the same. More specifically, the present invention relates to a rubber composition for a tire sidewall which can improve the rolling resistance property to a large degree without causing a deterioration in crack resistance and appearance, and to a pneumatic tire using the rubber composition for sidewalls.

The sidewall of a pneumatic tire is made of a rubber composition containing natural rubber, isoprene rubber and butadiene rubber as a main rubber component, which have a high degree of unsaturation and a double bond in the main chain. It is known that the double bond part of such high unsaturation rubber has a nature of reacting with ozone to induce depolymerization, and therefore cracks tend to generate on the rubber surface when the rubber is formed into a tire and the tire is left or run.

In order to prevent these problems, a crack inhibitor such as an amine antioxidant or a wax is compounded in the rubber composition of sidewall. However, when these chemicals bloom on the sidewall surface, the amine antioxidant tends to turn brown while the wax is likely to become white, and there has been a problem that the appearance of the sidewall becomes inferior in both cases.

A wide variety of methods are proposed for the purpose of solving the above problem. For example, it is described to apply butyl rubber or EPDM rubber on the surface of sidewall or tread of a tire to improve weatherability and crack resistance (JP-A-9-272306, JP-A-4-362404, JP-A-4-39105, JP-A-3-276801, JP-A-2-102805, JP-A-2-45202 and JP-A-1-207307). However, though these methods contribute to improved appearance of tires, there is the problem that flexing durability and crack growth resistance becomes inferior and adhesion with other rubbers is decreased.

An object of the present invention is to provide a rubber composition for a tire sidewall capable of preventing color change to brown, which has been regarded as a problem of automobile tires, while achieving sufficient ozone resistance and low heat build-up characteristics, and a pneumatic tire having a sidewall comprising the rubber composition.

SUMMARY OF THE INVENTION

In the present invention, rolling resistance property (low heat build-up characteristics) is improved without reducing color change resistance and ozone resistance by compounding calcium carbonate to the rubber composition for sidewall.

That is, the present invention relates to a rubber composition for sidewall comprising, 5 to 150 parts by weight of carbon black having nitrogen adsorption specific surface area of 70 to 300 m$^2$/g and 5 to 100 parts by weight of calcium carbonate based on 100 parts by weight of a rubber component comprising 20 to 70% by weight of a natural rubber and 30 to 80% by weight of a synthetic diene rubber.

It is preferable that the calcium carbonate has nitrogen adsorption specific surface area of at least 5 m$^2$/g.

The present invention also relates to a pneumatic tire having sidewalls comprising the rubber composition.

DETAILED DESCRIPTION

The rubber composition for the tire sidewalls of the present invention contains a natural rubber and a synthetic diene rubber as a rubber component.

The amount of the natural rubber is 20 to 70% by weight. When the amount of the natural rubber is less than 20% by weight, workability is decreased and sufficient strength at break cannot be achieved. Preferably, the lower limit of the amount of natural rubber is 30% by weight and the upper limit of the amount of natural rubber is 60% by weight.

Examples of synthetic diene rubber are butadiene rubber, styrene-butadiene rubber, isoprene rubber, isoprene-butadiene rubber, styrene-isoprene-butadiene rubber, styrene-isoprene rubber, chloroprene rubber, acrylonitrile-butadiene rubber and the like.

The amount of the synthetic diene rubber is 30 to 80% by weight. When the amount of the synthetic diene rubber is less than 30% by weight, crack resistance is decreased. When the amount of the synthetic diene rubber is more than 80% by weight, processability is decreased. Preferably, the lower limit of the amount of the synthetic diene rubber is 40% by weight and the upper limit of the amount of the synthetic diene rubber is 70% by weight from the viewpoint of crack resistance and processability.

The rubber composition for the tire sidewalls of the present invention contains carbon black having nitrogen adsorption specific surface area (N$_2$SA) of 70 to 300 m$^2$/g. When N$_2$SA is less than 70 m$^2$/g, sufficient strength at break cannot be achieved since the dispersibility improving effect and reinforcing effect are small. When N$_2$SA is more than 300 m$^2$/g, the dispersibility is inferior and the flexing durability is lowered. Preferably, the lower limit of N$_2$SA is 80 m$^2$/g, in particular 100 m$^2$/g, and the upper limit of N$_2$SA is 280 m$^2$/g.

Concrete examples of carbon black used in the present invention are HAF, ISAF and SAF, but not limited thereto.

The amount of such carbon black is 5 to 150 parts by weight based on 100 parts by weight of the rubber component. When the amount of carbon black is less than 5 parts by weight, sufficient reinforcing effect cannot be achieved. When the amount of carbon black is more than 150 parts by weight, heat build-up characteristics are increased. Preferably, the lower limit of the amount of carbon black is 20 parts by weight, in particular 30 parts by weight, and the upper limit of the amount of carbon black is 120 parts by weight, in particular 100 parts by weight from the viewpoint of reinforcing property and low heat build-up characteristics.

The rubber composition of the present invention contains calcium carbonate. The nitrogen adsorption specific area (N$_2$SA) of the calcium carbonate is at least 5 m$^2$/g. When N$_2$SA is less than 5 m$^2$/g, the reinforcing property is decreased, and the strength at break and corrosion resistance are also decreased. Preferably, the lower limit of N$_2$SA of the calcium carbonate is 10 m$^2$/g, and the upper limit of N$_2$SA of the calcium carbonate is 100 m$^2$/g.

As calcium carbonate, activated calcium carbonate obtained by surface treatment using an organic material is preferable from the viewpoint of improving dispersibility to the rubber, though there is no particular limitation. Organic materials used for the surface treatment are not particularly limited as long as they are generally used for surface treatment of calcium carbonate. Examples thereof include fatty acids, resin acids and surfactants.

The amount of the calcium carbonate is 5 to 100 parts by weight based on 100 parts by weight of the rubber component. When the amount of the calcium carbonate is less than 5 parts, improving the effect on heat build-up characteristics is small. When the amount of the calcium carbonate is more than 100 parts, workability is decreased. Preferably, the lower limit of the amount of calcium carbonate is 10 parts by weight, and the upper limit of the amount of calcium carbonate is 80 parts by weight, in particular 65 parts by weight.

In addition to the rubber component, carbon black and calcium carbonate, the rubber composition of the present invention may be incorporated with compounding agents such as softener, wax, antioxidant, vulcanizing agent, vulcanization accelerator and auxiliary vulcanization activator which are used in the normal rubber industry, if necessary.

The rubber composition of the present invention has excellent color change resistance, ozone resistance and rolling resistance property, and therefore can be suitably used for sidewall of pneumatic tires.

EXAMPLES

The present invention is explained in detail based on Examples below, but not limited thereto.

Materials used in Examples and Comparative Examples are listed below.

Natural rubber: RSS #3
Butadiene rubber: BR150B available from Ube Industries, Ltd.
Carbon black: SHOBLACK N330 ($N_2SA$: 80 to 100 $m^2/g$) available from Showa Cabot Co. Ltd.)
Calcium carbonate: Hakuenka CC available from SHIRAISHI KOGYO KAISHA LTD. (treated with fatty acid; $N_2SA$: 26 $m^2/g$)
Wax: Ozoace 0355 available from Nippon Seiro Co., Ltd.
Antioxidant: Nocluc 6C (N-(1,3-dimethylbutyl)-N'-phenyl-p-phenylenediamine) available from Ohuchi Shinko Kagaku Kogyo Co. Ltd.
Aromatic oil: DINA Process Oil X140 available from Japan Energy Corporation
Stearic acid: stearic acid available from NOF Corporation
Zinc oxide: Zinc Oxide No. 1 available from Mitsui Mining and Smelting Co., Ltd.
Sulfur: powdery sulfur available from Tsurumi Chemicals Co., Ltd.
Vulcanization accelerator TBBS: Nocceler NS (N-tert-butyl-2-benzothiazoylsulfenamide available from Ohuchi Shinko Kagaku Kogyo Co. Ltd.

Examples 1 to 4 and Comparative Examples 1 to 2

According to the compound list of Table 2, materials other than sulfur and vulcanization accelerator were mixed for 5 minutes by using a 1.7-liter sealed Banbury mixer. Then sulfur and vulcanization accelerator were mixed thereto by using an open roll. The obtained compound was press-vulcanized at 170° C. for 20 minutes to obtain 2-mm thick sheets of vulcanized rubber.

In addition, each rubber compounded above was formed into a 0.5-mm thick piece, and the piece was attached to the side part of a pneumatic tire having a size of 180/70R14. Vulcanization was carried out at 170° C. for 12 minutes to obtain tires. The obtained vulcanized rubber sheets and tires were subjected to the following tests.

(Tension Test)

In accordance with JIS K6301, the vulcanized rubber sheets were punched out to obtain No. 3 test pieces. Tensile stress at break TB (MPa) and elongation at break $E_B$ (%) were measured under the condition of 25° C. and tension speed of 500 mm/minute.

(Dynamic Viscoelasticity Test)

The loss tangent (tan δ) of each vulcanized rubber sheet was measured by using a viscoelasticity spectrometer VES (made by Iwamoto Corporation) at 70° C. under initial strain of 10% and dynamic strain of 2%. The loss tangent value of each sheet was represented as an index to the tan δ value of Comparative Example 1 as 100 according to the following equation. The larger the index, the more excellent the rolling resistance property (tan δ index).

(tan δ index)=×100

(Ozone Resistance Test)

In accordance with JIS K6301, each of vulcanized rubber sheets was stretched by 40%, and with maintaining the stretch, exposed to ozone for 96 hours continuously under atmosphere of an ozone concentration of 50±5 ppm and a temperature of 40° C. After the exposure, the sample was taken out from the tester and generation of crack was observed according to the criterion shown in Table 1.

TABLE 1

| Number of cracks | Size and depth of crack |
|---|---|
| A: not many | 1: Not visible by the naked eye but confirmed by magnifier of 10 magnifications |
| B: many | 2: Visible by the naked eye |
| C: too many | 3: Deep and relatively large (less than 1 mm) |
| | 4: Deep and large (1 mm to less than 3 mm) |
| | 5: 3 mm or deeper or likely to be cut |

(Color Change Test)

After the ozone resistance test, degree of color change of the samples was visually observed and evaluated on a scale of 1 to 5. Scale 5 means that the sample remains black (no color change) and scale 1 means that the sample turned brown (remarkable color change). The larger the score, the smaller the color change and the more favorable the property.

(Durability Test on Drum)

In accordance with JIS D4230, sample tires were subjected to durability test on drum. After the test, the side part was cut and observed whether or not the thin layer and the inside portion were peeled from each other. The evaluation mark x means that peeling was observed, while O means that peeling was not observed.

(Rolling Resistance Test)

The rolling resistance was measured by setting each sample tire in a rim having a rim diameter of 14 inches and a rim width of 5 inches by using a rolling resistance measuring machine with a drum diameter of 1,707 mm at room temperature of 38° C. and at a speed of 80 km/hour. The air pressure was 200 kPa and the load was 375 kg. The rolling resistance value was represented as an index to the rolling resistance value of Comparative Example 1 as 100 according to the following equation (rolling resistance index). The larger the index, the more excellent the rolling resistance property.

(Rolling resistance index)=×100

Results are shown in Table 2.

In Comparative Example 2 where wax and antioxidant were not compounded, tensile properties were inferior and ozone resistance, durability and rolling resistance property were unsatisfactory.

In Comparative Example 1, wax and antioxidants were compounded, and therefore tensile properties, ozone resistance, durability and rolling resistance property were improved. However, color change was remarkable, and effect of improving ozone resistance and rolling resistance property were small.

On the other hand, in Examples 1 to 4, ozone resistance and rolling resistance property were improved without decreasing color change resistance by compounding calcium carbonate.

TABLE 2

|  | Ex. 1 | Ex. 2 | Ex. 3 | Ex. 4 | Com. Ex. 1 | Com. Ex. 2 |
|---|---|---|---|---|---|---|
| Compound (part by weight) | | | | | | |
| Natural rubber | 50 | 50 | 50 | 50 | 50 | 50 |
| Butadiene rubber | 50 | 50 | 50 | 50 | 50 | 50 |
| Carbon black | 40 | 35 | 50 | 50 | 50 | 50 |
| Calcium carbonate | 10 | 15 | 5 | 10 | — | — |
| Wax | 2 | 2 | 2 | 2 | 2 | — |
| Antioxidant | 3 | 3 | 3 | 3 | 3 | — |
| Stearic acid | 2 | 2 | 2 | 2 | 2 | 2 |
| Zinc oxide | 3 | 3 | 3 | 3 | 3 | 3 |
| Sulfur | 1.5 | 1.5 | 1.5 | 1.5 | 1.5 | 1.5 |
| Vulcanization accelerator TBBS | 1 | 1 | 1 | 1 | 1 | 1 |
| Property | | | | | | |
| $T_B$ (MPa) | 16.4 | 15.8 | 17.0 | 16.8 | 16.5 | 10.8 |
| $E_B$ (%) | 450 | 470 | 455 | 460 | 460 | 370 |
| Tan δ index | 108 | 113 | 103 | 106 | 100 | 96 |

TABLE 2-continued

|  | Ex. 1 | Ex. 2 | Ex. 3 | Ex. 4 | Com. Ex. 1 | Com. Ex. 2 |
|---|---|---|---|---|---|---|
| Performance | | | | | | |
| Ozone resistance | C-2 | B-2 | C-2 | C-2 | C-3 | C-5 |
| Color change | 3 | 4 | 3 | 3 | 3 | 5 |
| Drum durability test | ○ | ○ | ○ | ○ | ○ | X |
| Rolling resistance index | 106 | 109 | 101 | 102 | 100 | 93 |

According to the present invention, rolling resistance property can be improved without decreasing color change resistance and ozone resistance by compounding a suitable amount of calcium carbonate in the rubber composition for sidewall.

What is claimed is:

1. A rubber composition for sidewall comprising,
   5 to 150 parts by weight of carbon black having nitrogen adsorption specific surface area of 70 to 300 m²/g and
   5 to 100 parts by weight of calcium carbonate having a nitrogen adsorption specific surface area of at least 5 m²/g, based on 100 parts by weight of a rubber component comprising 20 to 70% by weight of a natural rubber and 30 to 80% by weight of a synthetic diene rubber.

2. The rubber composition of claim 1, wherein the calcium carbonate is present in an amount of 10 parts by weight to 65 parts by weight.

3. A pneumatic tire having sidewall comprising the rubber composition of claim 1.

* * * * *